United States Patent
Walsh

(10) Patent No.: US 7,730,531 B2
(45) Date of Patent: Jun. 1, 2010

(54) SYSTEM AND METHOD FOR DETECTION OF ARTIFICIALLY GENERATED SYSTEM LOAD

(75) Inventor: James E. Walsh, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1439 days.

(21) Appl. No.: 11/106,559

(22) Filed: Apr. 15, 2005

(65) Prior Publication Data

US 2006/0235827 A1 Oct. 19, 2006

(51) Int. Cl.
G06F 11/00 (2006.01)

(52) U.S. Cl. .............................. 726/22; 726/23; 726/25; 707/3

(58) Field of Classification Search ...................... 713/1, 713/2, 188, 194; 380/200, 201, 255, 277; 726/2, 22, 23, 25; 707/3
See application file for complete search history.

(56) References Cited

U.S. PATENT DOCUMENTS

| | | | | |
|---|---|---|---|---|
| 5,062,055 A * | 10/1991 | Chinnaswamy et al. | ..... | 702/182 |
| 5,619,676 A * | 4/1997 | Fukuda et al. | ............... | 711/137 |
| 5,787,467 A * | 7/1998 | Abe | ............................ | 711/118 |
| 6,826,570 B1 * | 11/2004 | Eshel et al. | ..................... | 707/8 |
| 7,099,320 B1 * | 8/2006 | Salerno | ...................... | 370/389 |
| 7,318,124 B2 * | 1/2008 | Hama et al. | .................. | 711/118 |
| 7,337,214 B2 * | 2/2008 | Douglass et al. | ............ | 709/214 |
| 2005/0004949 A1 * | 1/2005 | Trepess et al. | ............ | 707/104.1 |
| 2005/0108377 A1 * | 5/2005 | Lee et al. | ..................... | 709/223 |
| 2005/0286430 A1 * | 12/2005 | Koga et al. | .................. | 370/241 |

* cited by examiner

*Primary Examiner*—Kimyen Vu
*Assistant Examiner*—Joseph Pan
(74) *Attorney, Agent, or Firm*—Shook, Hardy & Bacon LLP

(57) ABSTRACT

A system and method are provided for detecting artificially generated load on a search system. The system may include a load monitoring component for monitoring a current load for comparison with an expected load. The system may additionally include an abnormality detection component for detecting an abnormality when the monitored load exceeds an expected amount by a predetermined threshold. The system may further include an analysis component for determining if the monitored load is an artificial load.

11 Claims, 5 Drawing Sheets

SYSTEM AND METHOD FOR DETECTION OF ARTIFICIALLY GENERATED SYSTEM LOAD

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to a system and method for detecting abnormal and potentially destructive search activities. In particular, embodiments of the invention relate to a method and system for detection of artificially generated system load.

BACKGROUND OF THE INVENTION

Through the Internet and other networks, users have gained access to large amounts of information distributed over a large number of computers. In order to access the vast amounts of information, users typically implement a user browser to access a search system. The search system responds to an input user query by returning one or more sources of information available over the Internet or other network.

Online services build search systems designed to handle expected user load. The search systems are typically built to a capacity to exceed the expected amount of legitimate load in order to provide some level of buffer. However, the higher the capacity, the greater the cost and complexity of the system, so it is highly desirous to not provide more capacity that will realistically be necessary.

Illegitimate load, which may be defined as load on a search system that is not serving the business purposes of the system, can cost a large amount of money to support and can also cause system performance problems. A particular type of illegitimate load is termed a Denial Of Service (DOS) attack. A DOS attack is artificially generated load explicitly developed to disrupt service of legitimate users.

Illegitimate load may raise costs by forcing a search system to repeatedly access more expensive resources in a time-consuming manner. For example, search systems typically store results for popular queries in a cache that is easily and quickly accessed. An attacker may generate multi-word randomized queries for which the search system will not have results stored in the cache, thus forcing the search system to access an index system for each query. The index system may include at least one small index and at least one large index. Accessing the large index will typically require the largest amount of computation and cause the search system to incur the greatest expense. A skilled attacker may formulate queries for which the search system will have to access the larger index.

In some search systems, a substantial portion of all search requests may occupy more than five hundred machines for a period of time. Across many computers, ten to one hundred computer minutes may be required for a single request that is well-crafted to require computation.

Generally, an extraordinarily high number of search queries may indicate an attempt to cause system disruption through a DOS attack. The DOS attacks may fall into two categories. A malicious attack may occur when a user attempts to bring down or reduce the capacity of a site for a malicious purpose such as a financial purpose. A non-malicious attack may occur when a user dominates the search system for non-malicious reasons. For instance, a researcher may implement multiple computers at a very high rate to research a topic through a search system.

It is also possible that this abnormally high number or search queries is not a synthetic event such as a DOS attack, but is rather the result of a natural event causing the abnormally high traffic. Accordingly, a solution is needed that determines whether a number of queries is abnormal and further determines whether a high traffic event is natural or artificial.

BRIEF SUMMARY OF THE INVENTION

Embodiments of the present invention include a method for a system for detecting artificially generated load on a search system. The system includes a load monitoring component for monitoring a current load for comparison with an expected load. The system additionally includes an abnormality detection component for detecting an abnormality when the monitored load exceeds an expected amount by a predetermined threshold. The system may also include an analysis component for determining if the monitored load is an artificial load.

In an additional embodiment, a method is provided for detecting artificially generated load on a search system. The method includes monitoring a current load on a search system and comparing the current load with an expected load. The method further includes detecting an abnormality if the current load exceeds the expected load by a predetermined threshold and analyzing the abnormality to determine if the abnormal load is artificial or natural.

In yet an additional aspect, a method is provided for determining if a detected load on a search system is natural or artificial. The method includes determining a current cache hit ratio and comparing the current cache hit ratio to an average cache hit ratio. The method may additionally include determining that the detected load is artificial if the current cache hit ratio is below the average cache hit ratio.

BRIEF DESCRIPTION OF THE DRAWINGS

The present invention is described in detail below with reference to the attached drawings figures, wherein.

DETAILED DESCRIPTION OF THE INVENTION

I. System Overview

Figure 1:
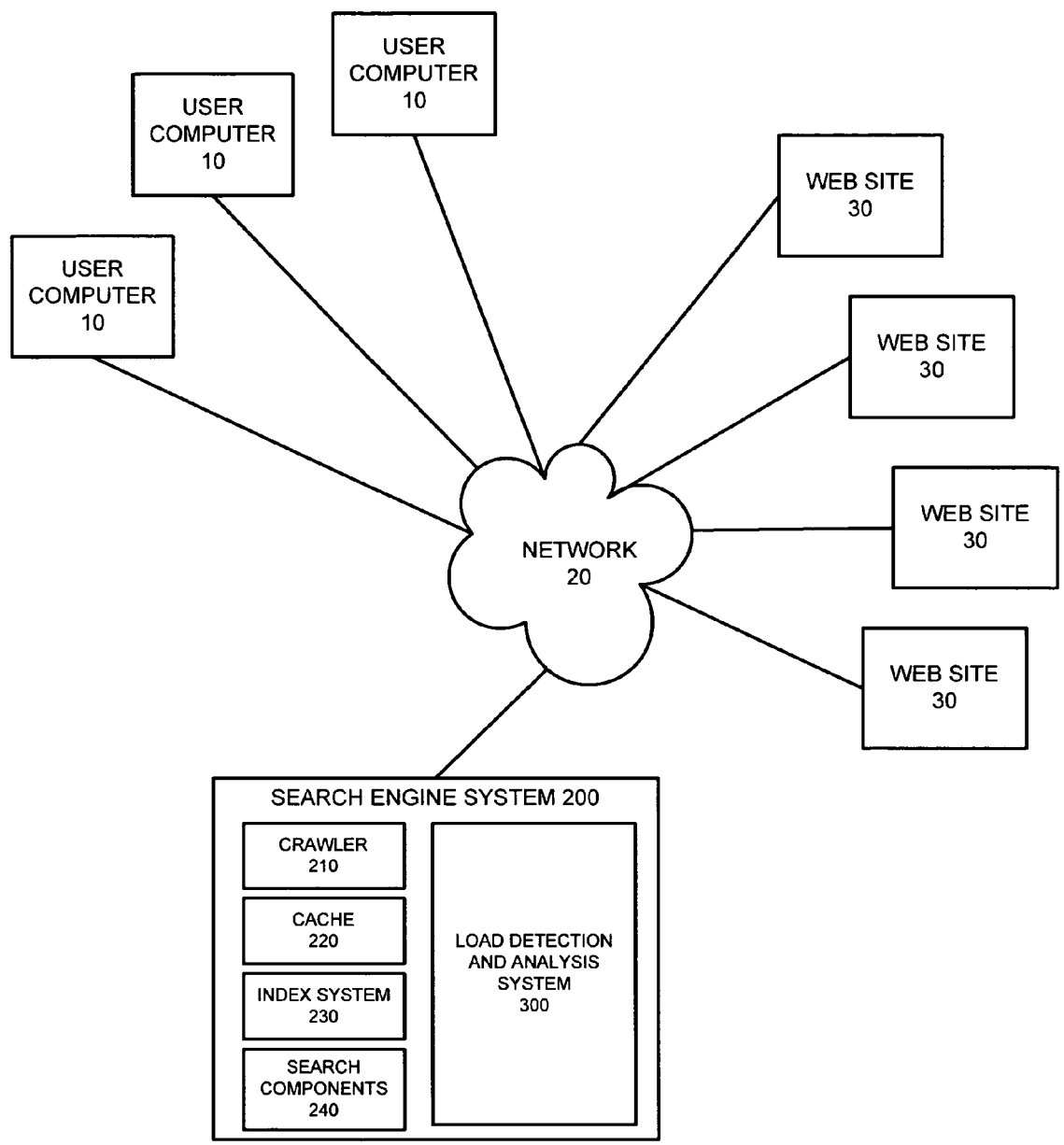
FIG. 1 is a block diagram illustrating an overview of a system in accordance with an embodiment of the invention.

Embodiments of the invention provide a method and system for detecting artificially generated load on a search system. FIG. 1 illustrates a system for detecting artificially generated load in accordance with an embodiment of the invention. A plurality of user computers 10 may be connected over a network 20 with a search engine 200. The search engine 200 may respond to a user query by searching multiple information sources 30 available over the network 20.

The search engine 200 may include a crawler 210, a cache 220, an index system 230, search components 240, and a load detection and analysis system 300. The crawler 210 may crawl available websites 30 to construct the index system 230. The index system 230 may include keyword information from the traversed websites 30. The cache 220 may be utilized to store recently accessed results so that the search system 200 will not have to access the index system 230 in order to retrieve popular results. The search system 200 may include additional known components, omitted for simplicity.

The load detection and analysis system 300 may be implemented to detect abnormal load on the search system 200. If the load detection module 300 detects abnormal load, it may also detect whether the abnormal load is synthetic or natural. The presence of a synthetic abnormal load may trigger other actions. For instance, upon detection, the search system 200 may send degraded results to a potential attacker. The degraded results may be inexpensive to deliver. If the load detection module 300 detects a potentially malicious attack, it may deliver information to a security system in order to resolve the problem. Although the load detection and analysis system 300 is shown as part of the search system 200, it may also be a separate system or component.

II. Exemplary Operating Environment

Figure 2:
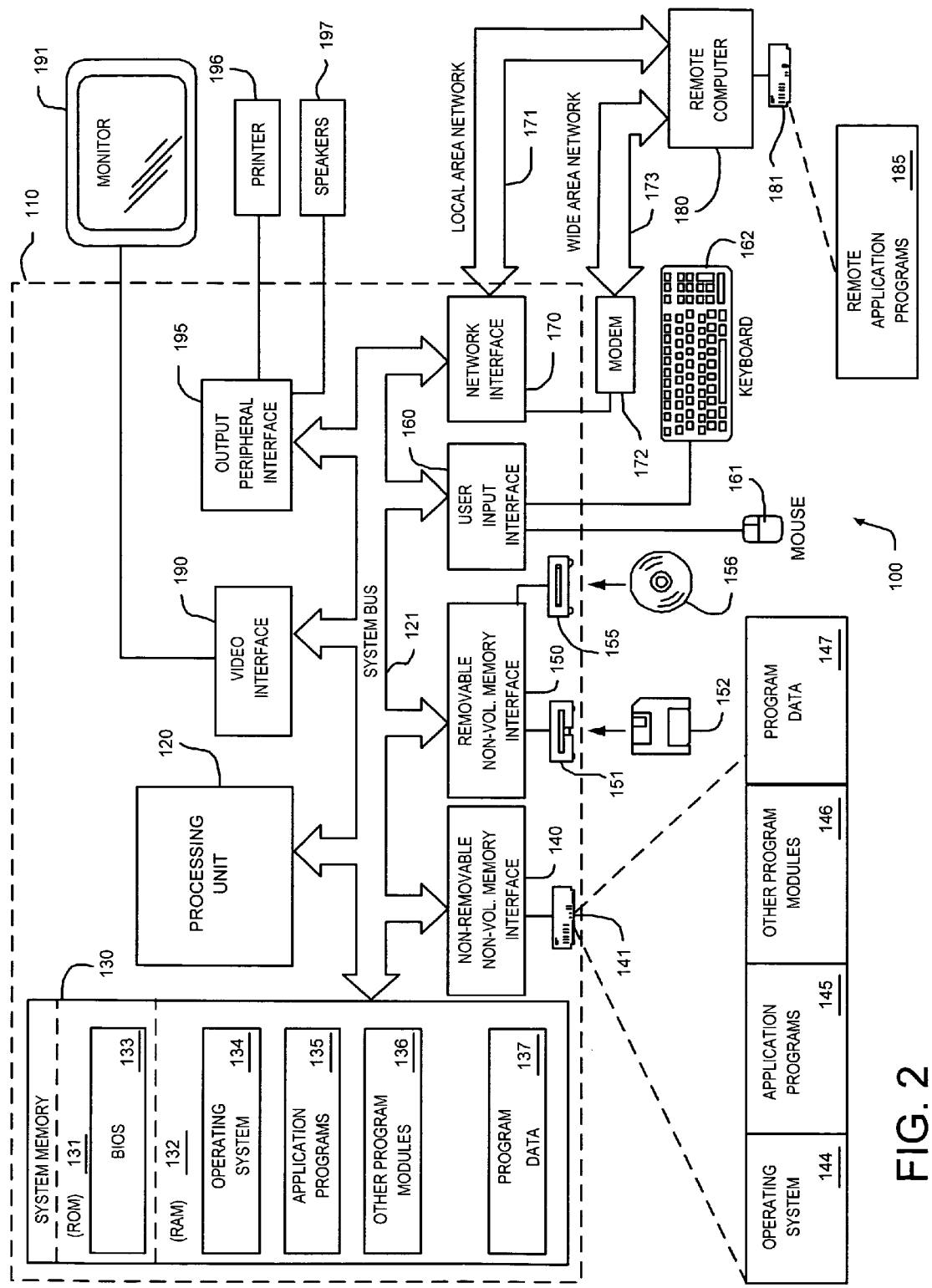
FIG. 2 is block diagram illustrating a computerized environment in which embodiments of the invention may be implemented.

FIG. 2 illustrates an example of a suitable computing system environment 100 on which the system for load detection and analysis may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or non-volatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

As set forth above, FIG. 1 illustrates a system for load detection and analysis in accordance with an embodiment of the invention. The system may operate in conjunction with user computers 10 connected over the network 20 with the search engine 200. As described above with respect to FIG. 2, the network 20 may be one of any number of different types of networks.

The search system 200 may respond to a user query by first searching the cache 220 for stored results. If no results are found in the cache 220, the search system 200 may search the index system 230. Typically, the index system 230 may be implemented on multiple computers and may include a large index and a small index. The search components 240 will search the small index before the large index. The small index is typically more easily accessible and less expensive to search than the large index. The search engine 200 may include additional known components, omitted for simplicity.

The load detection and analysis system 300 detects abnormal and artificial loads. Typical search systems are designed to handle a selected number X of queries per second during a peak load period. At midnight in a selected time zone, the normal system load might only be ¼ X. It would be unusual for the system to experience a load of ¾X, or three times the expected traffic at that time of night. However, such a load would still be within system design limits. In such an instance, the load detection and analysis system 300 may detect an abnormally high load and may trigger a determination of whether the abnormally high load is a natural or synthetic event. A natural event, such as a large news event, may cause many more users than normal to enter search queries. An artificial or synthetic event may be caused by the launch of one or more DOS attack attempts.

Figure 3:
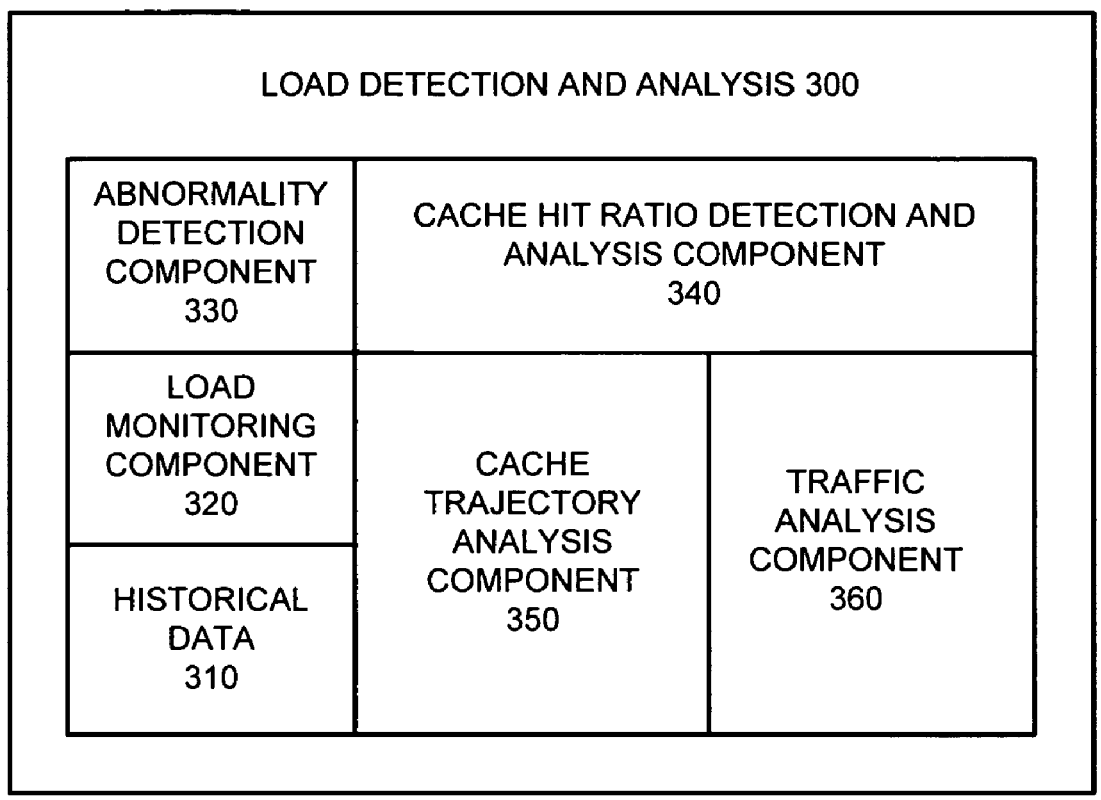
FIG. 3 is a block diagram illustrating a load detection and analysis system in accordance with an embodiment of the invention.

FIG. 3 is a block diagram illustrating components of the load detection and analysis system 300 in accordance with embodiments of the invention. The load detection and analysis system 300 may include historical load data 310 and a load monitoring component 320 for monitoring load and supplementing the historical load data 310. The load detection and analysis system 300 may also include various components for determining whether a load is natural or artificial. Such components may include a cache hit ratio detection and analysis component 340, a cache trajectory analysis component 350, and a traffic analysis component 360.

Generally, to determine if traffic is abnormally high, the load monitoring component 320 monitors the current load and compares it with the historical data 310. The historical data 310 may include expected load values or historical norms. The comparison may implement standard deviations from a smoothed historical norm for a time and day of week, preferably taking into account holidays and seasonal or other noticeable trends. If, for example, the current load is two standard deviations above the mean load, the load monitoring component 320 detects this load, and the abnormality detection component 330 determines if the load is abnormal. For example, while monitoring on a Monday night, the load monitoring component 320 may determine that the traffic is double the normal amount for a Monday at midnight. Although the amount of traffic may be well below peak system capacity, the abnormality detection component 330 may detect an abnormality if the traffic is twice the normal amount given the date and time. The system 300 may formulate an alert if the traffic is outside of the normal range.

In response to detection of an abnormality, additional components of the load detection and analysis system 300 may be implemented to determine if the abnormal load is natural or synthetic. A natural event is generally considered to be legitimate traffic coming from human end users. Naturally high traffic rates might occur as a result of a breaking news event. Artificial or synthetic load is typically generated by computerized traffic to a site.

Several techniques exist for differentiating natural traffic from synthetic traffic. First, the cache hit ratio detection and analysis component 340 can detect and analyze the cache hit ratio. The cache 220 stores as many recent queries as possible so that when a common query is input, the search system 200 can fetch results from the cache 220 and return them quickly. A typical cache hit ratio might be around 70%. Thus 30% of the queries would miss the cache and be sent to the index system 230. If the traffic is a natural event resulting from breaking news, the cache hit ratio may be slightly higher than normal for the additional traffic, as the additional traffic will be weighted towards a smaller than normal set of terms that is related to the breaking news events. Thus, overall cache hit ratio will likely increase upon the occurrence of a natural event such as a news event.

Conversely, synthetic traffic may result in a reduced cache hit ratio A sophisticated attack, designed to be as expensive as possible, will intentionally avoid hitting the cache 220, so that the index system 230 will be accessed on each query, and thus latency will be high for this traffic and the cache hit ratio will be significantly reduced. If the system 200 experiences a reduced cache hit ratio, such that large percentage of additional traffic is not being cached, the system 300 recognizes a suspicious event. Multiple unique queries designed to avoid hitting the cache and thus cause high load likely represent a synthetic event. As an example, in a given search system, about 60% of all queries that miss the cache are served out of small index. The remaining queries require accessing of the large index, which requires disk activity and is expensive. Normally, only 12% of queries may access the large index. A well-crafted attack would include queries specifically designed to hit the large index. The cache hit ratio detection and analysis component 340 may raise an alert for example, if 20% of the queries are requiring access to the large index.

Generally, the most expensive loads are created by multi-word unique queries that include common enough words to be contained within many web pages. A well crafted attack would utilize a distributed set of machines to send multi-word randomized queries with relatively common words.

The cache trajectory analysis component 350 forms another component for determining if a load is synthetic or natural. If a newsworthy event, for example, a Tsunami or other natural disaster occurs, the search system 200 is not likely to experience an instantaneous increase in traffic. Instead, the news will spread over time, so that the discontinuity will probably be gradual. If the cache trajectory analysis component 350 detects an instantaneous increase in traffic, the load is more likely to be programmatic or synthetic. The cache trajectory analysis component 350 may operate independently of the cache hit ratio detection and analysis component 340 to detect an artificial load.

Traffic analysis components 360 may further contribute to distinguishing between natural and artificial queries. The traffic analysis components 360 may track an IP address from which each query is sent. One potential use of this tracking is to impose a rate limit from a particular IP address. The traffic analysis components 360 may include multiple rate limiting buckets. For example, the traffic analysis components may set a maximum of one query per second from a source because it's very unlikely that a legitimate user would enter more than one query per second. Furthermore, the traffic analysis components 360 may set limits on a per minute basis and a per hour basis. The traffic analysis components 360 may apply these limits to each IP address. However, rate limits often cause interference with legitimate traffic sent through proxies. For instance, some online carriers have a number of computers that act as proxies for all their users. All users may share, for example, ten total IP addresses. Accordingly, search systems that use rate limiting have problems dealing with queries originating with proxies.

Identifiers other than a user IP address can also be utilized by the traffic analysis component 360. When requests are received by the search system 200, the search system 200 receives a browser session identifier that is multi-digit random number generated by Internet Explorer. The traffic analysis component 360 can use this browser session identifier to determine if multiple queries are coming from the same browser session. Suspicion of artificial load may be generated if a very large number of requests from the same IP addresses have same browser identifier. However, since intelligent attackers may generate new browser identifiers, the traffic analysis component 360 may also consider a browser version identifier. Some browser version identifiers are actually programming languages. The traffic analysis component 360 may conclude that the load is synthetic based on the fact that a legitimate user would not send a query with a programming language as its browser identifier.

The traffic analysis component 360 may also monitor browser cookies. Most users have browser cookies enabled. Browser cookies are static for the lifetime of the user unless the user deletes the cookie. The user automatically sends the cookie with each query and if the traffic analysis component 360 determines that a large amount of traffic has no cookies turned on and the traffic without cookies has similar characteristics, the traffic analysis component 360 may determine that the traffic is synthetic.

The traffic analysis component 360 may further look for classes of queries. For instance, an attacker may design a virus that spreads by looking through email addresses and sends itself to the email addresses. The attack may perform an Internet search on the email address in order to find documents with more email addresses in them on the web. Such email queries would almost universally miss the cache. Accordingly, the traffic analysis component 360 may look for email queries or other classes of queries that fail to access the cache.

Figure 4:
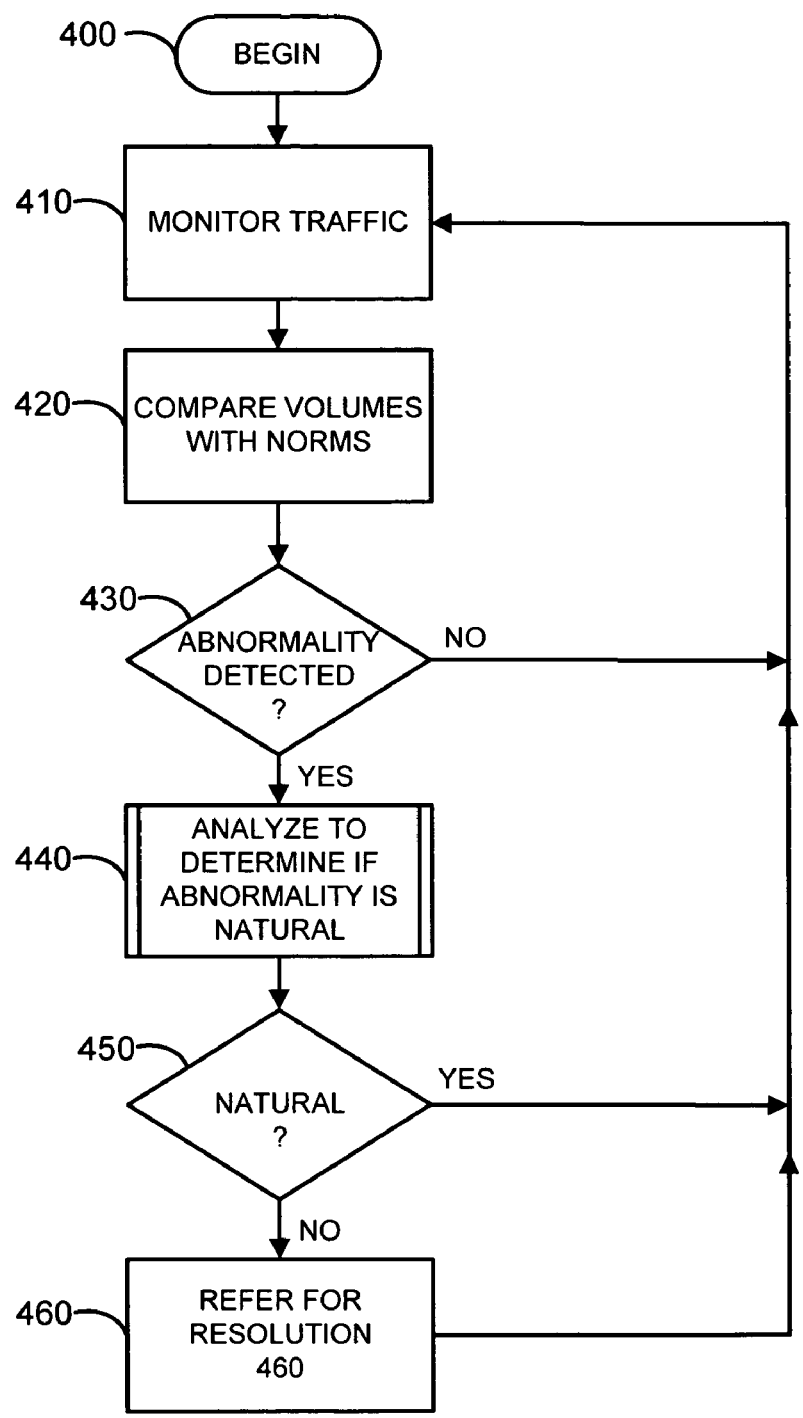
FIG. 4 is a flow chart illustrating a detection method in accordance with an embodiment of the invention.

FIG. 4 illustrates a simplified method for load detection and analysis in accordance with an embodiment of the invention. The method begins in step 400 and the load monitoring component 320 monitors load on the search system 200 in step 410. In step 420, the abnormality detection component 330 compares volumes observed by the load monitoring component 320 with historical load data 310 to determine if an abnormality is present. If no abnormality is detected in step 430, the system continues monitoring. If an abnormality is detected in step 430, components of the load detection system 300 determine if the abnormality is natural or synthetic in procedure 440. If the abnormality is found to be natural at 440, monitoring continues. If the abnormality is found to be synthetic, the system 300 may refer the matter for resolution in step 460. As illustrated, monitoring of system load may be a continuous process.

Figure 5:
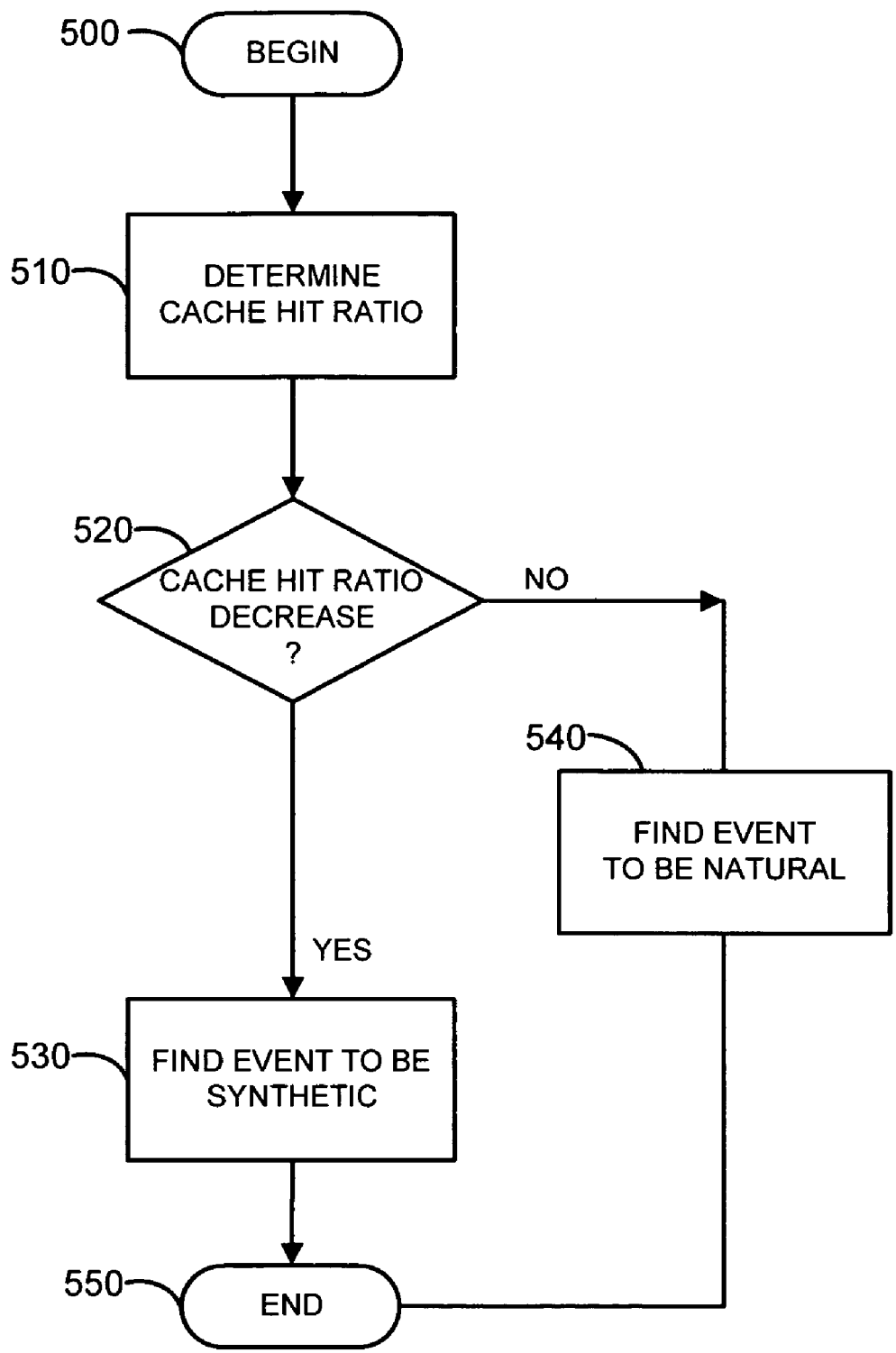
FIG. 5 is a flow chart illustrating a method for determining whether an event is natural or synthetic in accordance with an embodiment of the invention.

FIG. 5 illustrates a simplified method for determining whether a monitored load is natural or synthetic in accordance with an embodiment of the invention. The method begins in step 500. In step 510, the cache hit ratio detection and analysis component 340 determines the cache hit ratio. If the cache hit ratio has decreased in step 520, the cache hit ratio detection and analysis component 340 finds the event to be synthetic in step 530 and the method ends in step 550. If the cache hit ratio has not decreased, the system finds the event to be natural in step 540 and the process ends in step 550.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A system for detecting artificially generated load on a search system, the system including a processor and a computer storage medium and comprising:
   a load monitoring component for monitoring a current load for comparison with an expected load, wherein load comprises search queries received from users per unit time;
   an abnormality detection component for detecting an abnormal load,
      wherein the current load is compared to the expected load, and
      wherein an abnormality is detected when the current load exceeds the expected load by a predetermined threshold; and
   an analysis component for determining if the detected abnormal load includes an artificial load, the analysis component including a cache hit ratio component and a cache trajectory component, wherein the cache hit ratio component:
　determines a current cache hit ratio, cache hit ratio being a ratio of a number of search queries for which the search system returns results from a search system cache to a number of search queries for which the search system returns results from an index system,
　compares the current cache hit ratio to an average cache hit ratio for the search system, and
　determines that the detected abnormality is artificial if the current cache hit ratio is a predetermined amount below the average cache hit ratio, and
wherein the cache trajectory component:
　determines a cache trajectory, cache trajectory being a rate of change of cache hit ratio for the search system over a period of time.
　compares the cache trajectory to a predetermined threshold, and
　determines that the detected abnormal load is artificial if the cache trajectory is greater than the predetermined threshold.

2. The system of claim 1, further comprising a historical load data store comprising historical data based on date and time for comparison with the current load.

3. The system of claim 1, wherein the abnormality detection component finds an abnormality when the current load is separated by at least two standard deviations from the expected load.

4. The system of claim 1, wherein the analysis component comprises a traffic analysis component for determining whether the current load is artificial based on traffic characteristics.

5. One or more computer storage media having computer-usable instructions embodied thereon for performing a method for detecting artificially generated load on a search system, the method comprising:
　monitoring a current load on a search system, wherein load comprises search queries received from users per unit time;
　comparing the current load on the search system with an expected load on the search system;
　detecting an abnormality if the current load exceeds the expected load by a predetermined threshold; and
　upon detecting an abnormality:
　　determining a current cache hit ratio, wherein cache hit ratio is a ratio of a number of search queries for which the search system returns results from a search system cache to a number of search queries for which the search system returns results from an index system,
　　comparing the current cache hit ratio to an average cache hit ratio for the search system,
　　determining a cache trajectory, wherein the cache trajectory is a rate of change of cache hit ratio for the search system over a period of time,
　　comparing the cache trajectory to a predetermined threshold, and
　　determining that the detected abnormality is artificial if either the current cache hit ratio is a predetermined amount below the average cache hit ratio or the cache trajectory is greater than the predetermined threshold.

6. The media of claim 5, further comprising accessing a historical load data store containing historical load data based on date and time in order to compare the current load with the expected load.

7. The media of claim 5, further comprising detecting the abnormality when the current load is separated by at least two standard deviations from the expected load.

8. The media of claim 5, further comprising determining whether a load is artificial based on traffic characteristics.

9. A method for determining if a detected load on a search system is natural or artificial, the method comprising:
　determining a current cache hit ratio, wherein the cache hit ratio is a ratio of the number of search queries for which the system can return results stored in the cache to the number of search queries for which the system must access an index system;
　comparing the current cache hit ratio to an average cache hit ratio;
　determining that the detected load is artificial if the current cache hit ratio is a predetermined amount below the average cache hit ratio;
　determining a cache trajectory, wherein the cache trajectory is a rate of change of the cache hit ratio;
　comparing the cache trajectory to a predetermined threshold; and
　determining that the detected load is artificial if the cache trajectory is greater than the predetermined threshold.

10. The method of claim 9, further comprising implementing a traffic analysis component to determine whether load is artificial.

11. The method of claim 10, further comprising implementing the traffic analysis component to track deactivated browser cookies.

* * * * *

UNITED STATES PATENT AND TRADEMARK OFFICE
CERTIFICATE OF CORRECTION

| | | |
|---|---|---|
| PATENT NO. | : 7,730,531 B2 | Page 1 of 1 |
| APPLICATION NO. | : 11/106559 | |
| DATED | : June 1, 2010 | |
| INVENTOR(S) | : James E. Walsh | |

It is certified that error appears in the above-identified patent and that said Letters Patent is hereby corrected as shown below:

In column 9, line 15, in Claim 1, delete "time." and insert -- time, --, therefor.

Signed and Sealed this
Eighth Day of February, 2011

David J. Kappos
*Director of the United States Patent and Trademark Office*